(12) United States Patent
Davis (10) Patent No.: US 6,250,445 B1
(45) Date of Patent: Jun. 26, 2001

(54) BALL RAMP INERTIA BRAKE OIL BLOCKING RING

(75) Inventor: Alan R. Davis, Plainwell, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/524,777

(22) Filed: Mar. 14, 2000

(51) Int. Cl.⁷ .................................................. F16D 23/02
(52) U.S. Cl. .............................. 192/35; 192/222; 74/339
(58) Field of Search ............................. 192/35, 40, 222, 192/113.34, 70.23, 54.52; 74/339, 411.5

(56) References Cited

U.S. PATENT DOCUMENTS

| | | | |
|---|---|---|---|
| 2,091,270 | * | 9/1937 | Colman . |
| 2,555,215 | * | 5/1951 | Warner ..................................... 192/35 |
| 2,605,877 | * | 12/1952 | Winther . |
| 2,649,941 | * | 8/1953 | Doebeli . |
| 2,937,729 | * | 5/1960 | Sperr, Jr. ................................. 192/35 |
| 3,000,479 | * | 9/1961 | Mosbacher . |
| 5,372,106 | * | 12/1994 | Botterill .......................... 123/198 R |
| 5,528,950 | * | 6/1996 | Organek et al. ...................... 74/339 |
| 5,713,445 | | 2/1998 | Davis et al. . |
| 5,819,883 | | 10/1998 | Organek et al. . |
| 5,953,959 | * | 9/1999 | Organek et al. ....................... 74/339 |

* cited by examiner

Primary Examiner—Charles A Marmor
Assistant Examiner—Saúl Rodriguez
(74) Attorney, Agent, or Firm—Mitchell M. Musial, II; Howard D. Gordon (57) ABSTRACT

In a transmission inertia brake a ball ramp mechanism is used to load a clutch pack to slow a rotating transmission shaft where the clutch pack is carried on a one piece drive assembly having a gear section for meshing with a transmission gear, an extension section for engaging a thrust plate in an isolator assembly, a clutch section for engaging plurality of driven clutch plates in the clutch pack and a bearing section for rotational support within a brake housing. An armature having an angled peripheral surface engages a mating friction surface formed in an end plate to form a core clutch, the armature being magnetically pulled upon energization of an electrical coil. The armature is nonrotatably connected to the control ring of the ball ramp mechanism through at least one connecting pin. Belleville washers are used to apply an axial load on the ball ramp mechanism. A gerotor oil pump provides a cooling lubricant through the clutch pack in the ball ramp mechanism. A clutch cavity is sealed for maintaining oil contact with the clutch cavity and is at least partially defined by the drive assembly. The clutch cavity is further defined by an oil blocking ring.

12 Claims, 7 Drawing Sheets

BALL RAMP INERTIA BRAKE OIL BLOCKING RING

RELATED APPLICATIONS

This application claims priority of previously filed provisional U.S. Application Serial No. 60/125,711, filed Mar. 23, 1999.

FIELD OF THE INVENTION

The present invention relates to an inertia brake for a vehicle transmission. More specifically, the present invention relates to an inertia brake for a vehicle transmission where a ball ramp actuator is used to load a clutch pack according to a control signal.

DESCRIPTION OF THE PRIOR ART

Transmissions that have their shifting accomplished using actuators controlled by a microprocessor in response to a driver request and various sensor inputs have been developed and are just now entering the marketplace. Sophisticated electronic transmission controls are being used to control shift actuators that act to shift a gear change transmission independent of the driver. When a transmission countershaft and gear assembly are accelerated with the engine, a shift requires the shaft to be released usually by release of a master clutch. Shifting of such a multiple speed gear transmission without synchronizers requires that the speeds of the gears that are to be meshed be matched so that a smooth clutch tooth engagement can take place. For example, in order to upshift, a gear on a spinning shaft that exceeds the desired mesh speed (synchronous speed) must be allowed to slow before the gear shift can be effectuated. While the shaft is slowing, there is no driveline link between the engine and the transmission. If the vehicle is on an upgrade, especially when pulling a loaded trailer, disconnection of the transmission from the engine allows the vehicle to rapidly slow. Thus, while waiting for the transmission gear shaft to slow to synchronous speed, the vehicle itself slows enough that the gear ratio originally selected for the shift is no longer appropriate.

The next shift must then be calculated and selected by the electronic control package. Once again, as the electronic controller waits for the gear shaft to slow to synchronous, the vehicle continues to rapidly decelerate until the second selected downshift is no longer appropriate. Eventually, the vehicle may come to a stop without a successful upshift being accomplished. Problems in quickly executing a shift due to the length of time required for a transmission gear shaft to decelerate to synchronous speed with the engine results in operational problems as heretofore described.

To date, various traditional type braking devices have been used to reduce the rotational speed of a spinning transmission shaft. For example, shoe type brakes and disc clutches using springs for loading of a clutch pack have been used. The inertia brake devices can be connected to any shaft that is connected to rotate with the input shaft of the transmission including one or more countershafts. U.S. Pat. No. 5,528,950 entitled "Transmission Inertia Brake With Ball Ramp Actuator", assigned to the assignee of the present invention, the disclosure of which is incorporated herein by reference, discloses using a ball ramp actuator to load a clutch pack.

In a transmission inertia brake, such as the inertia brake disclosed in U.S. Pat. No. 5,528,950 oil is provided to the clutch pack for cooling. Insufficient oil in the clutch pack can cause excess heat which may result in premature wear of friction material. Therefore, there exists a need to provide a transmission inertia brake that assures an adequate oil supply will be provided to the clutch pack.

SUMMARY OF THE INVENTION

The present invention provides for the braking and subsequent slowing of the rotation of a selected transmission shaft in a gear change transmission by means of an inertia brake. The inertia-brake of the present invention has a clutch pack comprised of a plurality of clutch friction pads which are clamped together by means of a ball ramp actuator.

The degree of activation of the ball ramp actuator and hence the axial loading on the clutch pack, is controlled by an electrical coil which acts to electromagnetically pull an armature into frictional contact with the end plate thereby providing a braking torque to the control ring of the ball ramp actuator. The ball ramp actuator then expands axially applying a braking force to the control ring which causes the clamping force to be applied to the clutch pack of the ball ramp actuator.

A detailed disclosure of the construction and operation of a ball ramp actuator device can be found in U.S. Pat. Nos. 2,091,270; 2,605,877; 2,649,941; 3,000,479 and 5,372,106, the disclosures of which are hereby incorporated by reference. The response time of the ball ramp actuator is quite rapid and the actuator has the unique characteristic of generating a very high axial force as compared to the braking force applied to the control ring by the electromagnetic action of the coil, typically in a ratio of over 50:1.

The clutch pack is made up of a plurality of clutch stationary plates grounded to a housing through a bolted hub and a similar number of clutch driven plates rotating with a shaft of the transmission which are compressed together upon energization of a ball ramp mechanism to apply a rotational retarding torque to the spinning transmission shaft to facilitate rapid gear changes in the transmission.

The inertia brake of the present invention can be applied to any rotating shaft in the transmission that requires reduction in its rotating speed to effectuate an event such as a gear ratio change. Thus, application of the inertia brake to the transmission input shaft and/or counter shaft or even to a power take off gear would be possible to assist in rapid gear ratio changes.

The use of the present invention would allow a transmission gear change event to be completed more rapidly and more reliably especially when sophisticated automatic electronic controls are utilized to perform the shift sequence including activation of the inertia brake. The transmission shifting controller cannot select the correct gear when the vehicle is on a steep grade if the transmission cannot be synchronized quickly to complete an upshift. In fact, the vehicle may decelerate so quickly that the transmission cannot be shifted into a correct gear and thus the vehicle will come to a complete stop or begin rolling in a rearward direction due to the inability to successfully shift the transmission after synchronization due to the inertia of the engine, shafts and gearsets within the transmission. The present invention allows the engine and the transmission shafts to be quickly slowed and brought into synchronization so that a shift can be quickly and reliably completed. The ball ramp actuator of the present invention can be used to axially load the clutch pack and provides a device with a more rapid response with low energy consumption and reduce packing size for the forces created as compared to prior art devices.

The inertia brake is bolted to the case of the transmission such that a transmission gear meshes with a gear section of a one-piece drive assembly in the inertia brake. The drive assembly consists of the gear section, an extension section, a clutch section and a bearing section. The one-piece construction lowers costs and makes for a more robust component.

To prevent inadvertent activation of the ball ramp mechanism due to oil drag on the control ring, an isolator assembly comprised of two thrust bearings each of which contact a thrust plate which is nonrotatably linked to the drive assembly. The first thrust bearing reacts against the inertia brake housing through an end plate while the second thrust bearing reacts against the control ring.

One provision of the present invention is to provide a compact, rapid response inertia brake for slowing a rotating transmission shaft.

Another provision of the present invention is to provide a compact, rapid response inertia brake for slowing a rotating transmission shaft utilizing a ball ramp actuator to load a clutch pack.

Another provision of the present invention is to provide a compact, rapid response inertia brake for slowing a rotating transmission shaft utilizing a ball ramp actuator to load a plurality of friction plates which are connected to rotate with the transmission shaft and others are connected to ground.

Another provision of the present invention is to provide a compact, rapid response inertia brake for slowing a rotating transmission shaft utilizing a ball ramp actuator wherein a control plate isolator assembly is used to eliminate any unintended frictional drag forces on the control plate of the ball ramp mechanism.

Another provision of the present invention is to provide a compact, rapid response inertia brake for slowing a rotating transmission shaft utilizing a ball ramp actuator to load a clutch pack where a one-piece drive assembly is comprised of gear, extension, clutch and bearing sections.

Another provision of the present invention is to provide a compact, rapid response inertia brake for slowing and rotating transmission shaft utilizing a ball ramp actuator to load a plurality of friction plates where an internal oil pump mechanism is incorporated to provide lubricant flow and absorb thermal energy.

Another provision of the present invention is to provide a transmission inertia brake which can be effectively mounted to a power take off section of a gear change transmission for meshing with a transmission gear.

Still yet another provision of the present invention is to provide a transmission inertia brake having a clutch cavity defined by a drive assembly where the clutch cavity is sealed for maintaining oil contact with the clutch pack.

DETAILED DESCRIPTION OF THE PREFERRED EMBODIMENT

For purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In this disclosure, certain terminology will be used in the following description for convenience in reference only and will not be limiting. For example, the terms "forward" and "rearward" will refer to directions forward and rearward of the inertia brake as installed on a transmission. The terms "rightward" and "leftward" will refer to directions in the drawings in connection with which the terminology is used. The terms "inwardly" and "outwardly" will refer to directions toward and away from, respectively, the geometric center of the brake assembly of the present invention. The terms "upward" and "downward" will refer to directions as taken in the drawings in connection with which the terminology is used. All foregoing terms mentioned above include the normal derivatives and equivalents thereof. The term transmission as used herein shall include all types of gear change transmissions including single countershaft and twin countershaft types.

Figure 1:
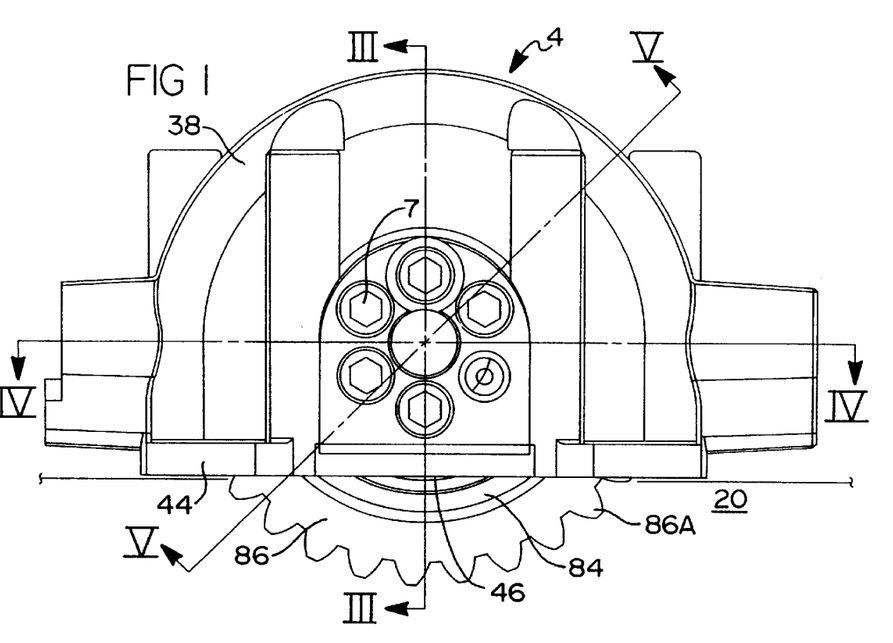
FIG. 1 is an end elevational view of the inertia brake of the present invention.

Now referring to FIG. 1 of the drawings, a front elevational view of the inertia brake 4 of the present invention is shown. One example of a clutch brake is disclosed in commonly assigned U.S. Pat. No. 5,713,445, entitled "Transmission Inertia Brake With Self Energizing", the disclosure of which is hereby incorporated by reference. The brake housing 38 is mounted to a gear change transmission housing 20 at base plate 44 with six (6) attachment bolts through apparatus 44A such that the gear section 86A of the drive assembly 86 meshes with a transmission gear (not shown). A plurality of attachment bolts 7 are used to hold certain of the internal parts of the inertia brake 4 in position, specifically a hub 46 which supports the drive assembly 86 through a bearing 84. Support shaft 6 extends through the brake housing 38 to provide rotational support for the star 92 of a gerotor oil pump 88 as shown in FIG. 3.

Figure 2:
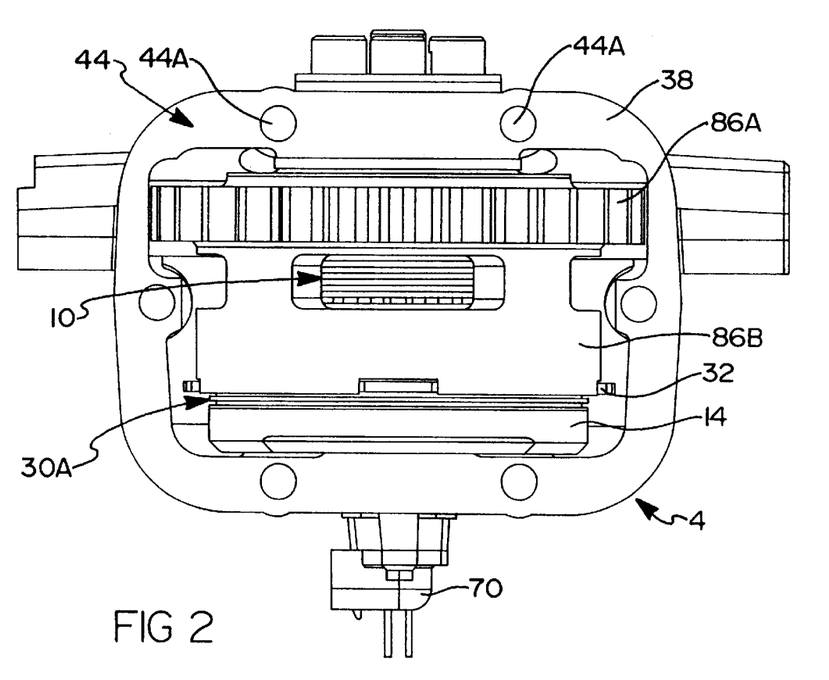
FIG. 2 is a bottom elevational view of the inertia brake of the present invention.

Now referring to FIG. 2 of the drawings, a bottom elevational view of the inertia brake of the present invention is shown. The extension section 86B has openings to the clutch pack 10 to allow oil to flow across the clutch pack 10 for cooling. A thrust bearing 30A reacts between a thrust plate 32 and an end plate 14 where the end plate 14 contains an electrical coil 12, as shown in FIG. 3, having electrical leads which join to a sealed connector 70 for connection with a control unit (not shown).

Figure 3:
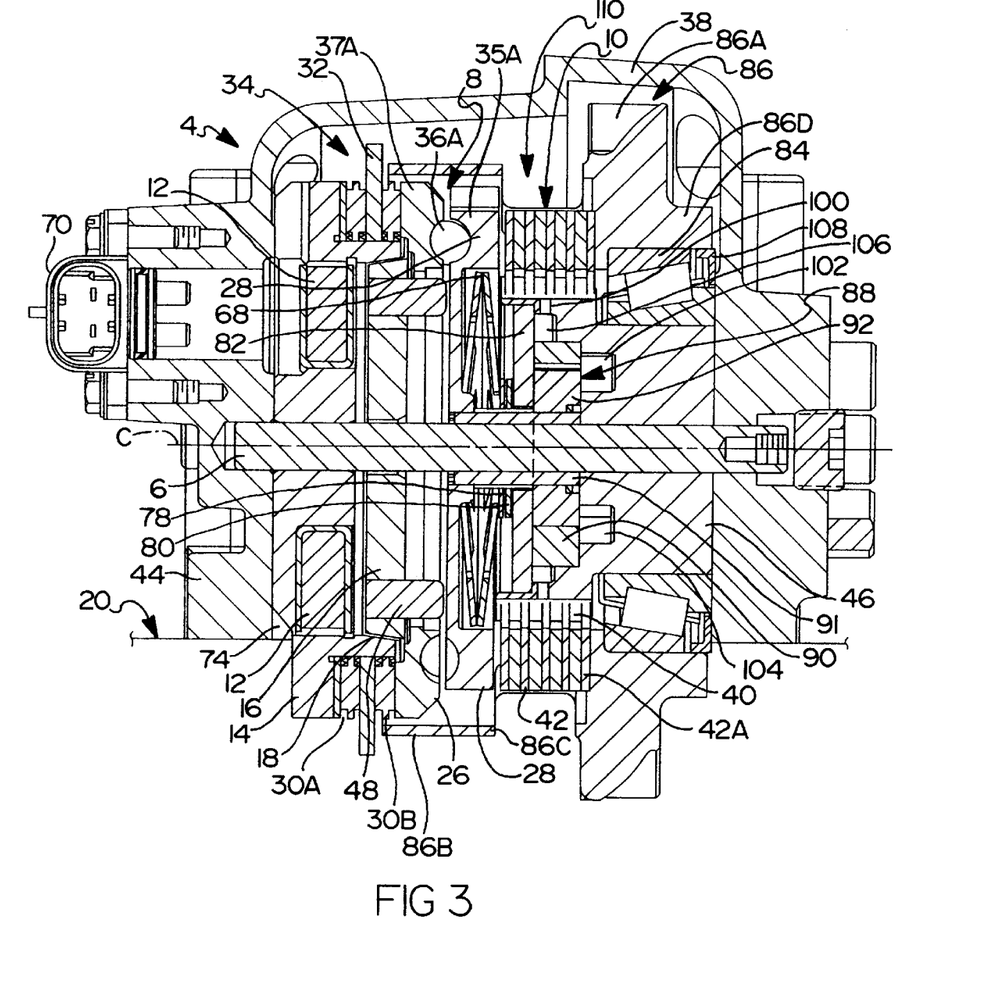
FIG. 3 is a sectional view of the inertia brake of the present invention.

Now referring to FIG. 3 of the drawings, a cross-sectional view of the inertia brake 4 of the present invention is shown. Support shaft 6 extends from a gear change transmission (not shown) and rotates on centerline C when driven by a prime mover such as an engine or when coasting. To properly shift the gear change transmission, the transmission shaft, which is commonly known as a countershaft, must be slowed so that the transmission gears can be synchronized and shifted into engagement. Ideally this shift event takes place in a short time period especially when the vehicle is operating on a grade. According to the present invention a ball ramp mechanism 8 is used to load a clutch pack 10 thereby frictionally coupling the transmission shaft to case ground thereby rapidly slowing the rotational speed of the transmission shaft for more rapid synchronization of the transmission gears to facilitate a rapid gear change The ball ramp mechanism is activated using an electrical coil 12 which produces an electromagnetic field so as to attract the armature 16 toward the end plate 14 causing a frictional braking torque to be generated at the tapered surfaces 18. The tapered surfaces 18 consist of mating surfaces formed on the armature 16 and on the end plate 14 to form what is known in the art as a "cone clutch". In a cone clutch, the frictional engagement increases as the armature 16 increases its engagement with the end plate 14 at the tapered surfaces 18. Note that most all of the rotating elements disclosed in the present invention are circular in shape and rotate around the rotational axis C. Pins 48 are attached to the armature 16 and axially extend to engage respective apertures formed in the control ring 26. This arrangement could be reversed with the pins 48 mounted to the control ring 26 and the apertures formed in the armature 16.

Figure 11:
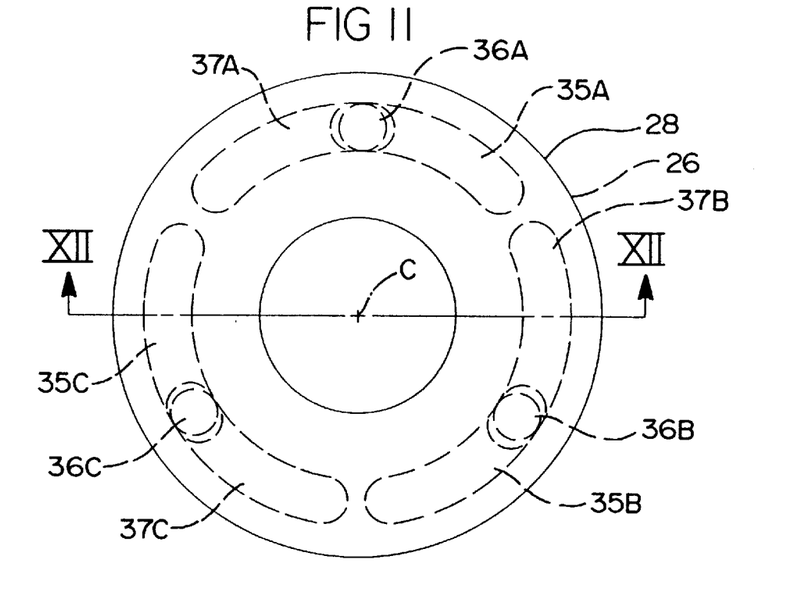
FIG. 11 is an illustrative front elevational view of the ball ramp assembly of the inertia brake of the present invention.
Figure 12:
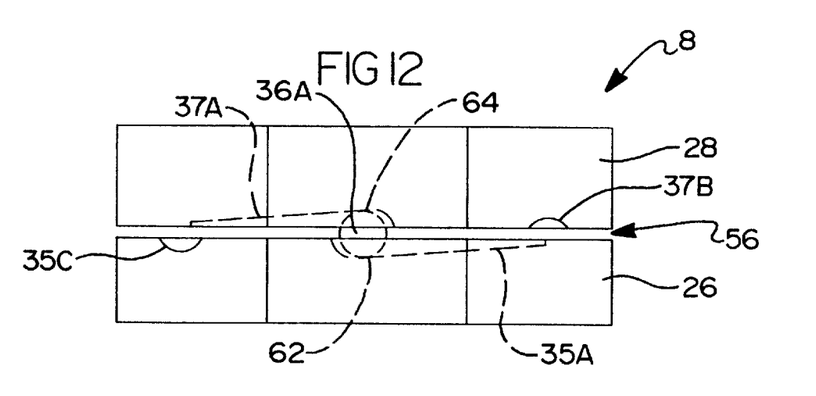
FIG. 12 is a cross-sectional view of the illustrative ball ramp assembly of FIG. 11 taken along line XII—XII in a normal state.
Figure 13:
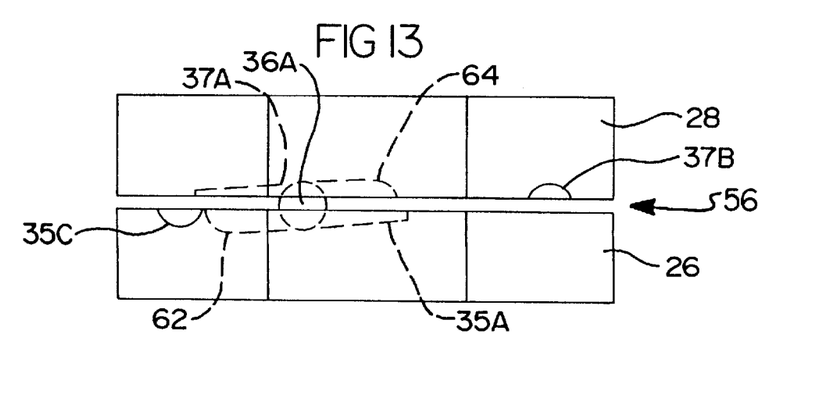
FIG. 13 is a cross-sectional view of the illustrative ball ramp assembly of FIG. 11 taken along line XII—XII in an activated state.

Referring now also to FIGS. 11, 12 and 13, the annular control ring 26 and the annular actuation ring 28 are axially separated by rolling elements 36A, 36B and 36C which ride in their respective control grooves 35A, 35B and 35C formed in the control ring 26 and in respective actuation grooves 37A, 37B and 37C formed in the actuation ring 28, the control and actuation grooves vary in axial depth. The axial separation between the control ring 26 and the actuation ring 28 is determined by the position of the rolling members 36A, 36B and 36C in their respective control and actuation grooves 35A, 37A and 35B, 37B and 35C, 37C. The ball ramp mechanism 8 is activated upon the introduction of electrical current into the coil 12 which draws the armature 16 away from the control ring 26 into the end plate 14 at the tapered surfaces 18 to apply a rotational braking force on the control ring 26. The braking force created on the control ring 26 causes relative rotation between the control ring 26 and the actuation ring 28 thereby causing the control ring 26 to axially separate from the actuation ring 28 and load the clutch pack 10.

Referring again to FIG. 3, the isolator assembly 34 consists of a thrust plate 32 which is rotatably driven by the extension section 86B of the drive assembly 86 flanked on respective sides by a first thrust bearing 30A and a second thrust bearing 30B. The first thrust bearing 30A rides against the thrust plate 32 and the end plate 14 while the second thrust bearing 30B rides against the thrust plate 32 and the control ring 26 thereby eliminating unintended rotational oil drag on the control ring 26. Without the isolator assembly 34, there would be unintended actuation of the inertia brake 4 due to rotational oil drag on the control ring 26 where the first thrust bearing 30A isolates the thrust plate 32 which is rotating with the drive assembly 86 from the stationary end plate 14. The second thrust bearing 30B separates the thrust plate 32 from the control ring 26 which is pinned to rotate with the armature 16 and is generally rotating with the drive assembly 86 except for a slight relative rotation to activate the ball ramp mechanism 8 when the coil 12 is energized by a control unit (not shown) thereby electromagnetically drawing the armature 16 into contact with the end plate 16 at the tapered surfaces 18 effectuating a braking torque on the armature 16 which is transferred by pins 48 through pin apertures 50 to the control ring 26.

The thrust bearings 30A and 30B function in the isolator assembly 34 to transfer axial forces from the control ring 26 to the end plate 14 thereby providing a reaction surface for the ball ramp mechanism 8 to provide a clamping force on the clutch pack 10. The thrust bearings 30A and 30B are separated by a thrust plate 32 where the thrust plate 32 is nonrotatably linked to the extension section 86B of the drive assembly 86 and functions to prevent parasitic drag from activating the ball ramp mechanism 8 when the coil 12 is deactivated by introducing the rotation of the drive assembly 86 into the thrust bearings 30A and 30B. With the use of the isolator assembly 34, the ball ramp mechanism 8 remains in a retracted, deactivated state when the current to the coil 12 is terminated and parasitic drag does not cause inadvertent activation of the ball ramp mechanism 8.

The clutch pack 10 is formed of a plurality of alternating driven clutch plates 40 and stationary clutch plates 42 where the driven clutch plates 40 are rotationally connected to the drive assembly 86 at the clutch section 86C where the drive assembly 86 is rotationally driven by the transmission shaft (not shown) through a gear section 86A. The stationary clutch plates 42 are keyed to the clutch housing 38 through the hub 46 at splines 46A (see FIG. 6). Thus, when the clutch pack 10 is compressed by the ball ramp mechanism 8, the rotating transmission shaft (not shown) is frictionally connected to the clutch housing 38 through the driven clutch plates 40 and the stationary clutch plates 42. The brake housing 38 is secured to the transmission case 20 with fasteners through base plate 44. The combination of the base plate 44, inertia brake housing 38, the end plate 14 and the hub 46 can be considered in total as the inertia brake housing 38 which is mounted to the transmission case 20 and remains relatively stationary.

The drive assembly 86 has a gear section 86A which meshes and is rotated with a transmission gear attached to a transmission shaft whose speed is to be braked with the inertia brake 4 of the present invention when up shifting the transmission gear ratio. An extension section 86B nonrotatably engages the thrust plate 32. The clutch section 86C, which is more clearly illustrated in FIG. 6, nonrotatably engages the driven clutch plates 40 which frictionally engage the stationary clutch plates 42 when the ball ramp mechanism 8 is energized.

Referring still to FIG. 3, the clutch pack 10 is comprised of a plurality of driven clutch plates 40 interdigitated with a plurality of stationary clutch plates 42. The driven clutch plates 40 are driven by and rotate with the drive assembly 86, while the stationary clutch plates 42 are keyed to case 20 through hub 46 and clutch housing 38. Friction material is applied to select surfaces of the driven clutch plates and/or the stationary clutch plates 42. When the ball ramp mechanism 8 is energized the clutch pack 10 is axially loaded so that the driven clutch plates 40 are frictionally coupled to the stationary clutch plates 42. Slippage within the clutch pack 10 generates heat which is absorbed by the lubricating oil which flows throughout the inside of the housing 38 aided by the pumping action of the gerotor type oil pump 88.

Figure 4:
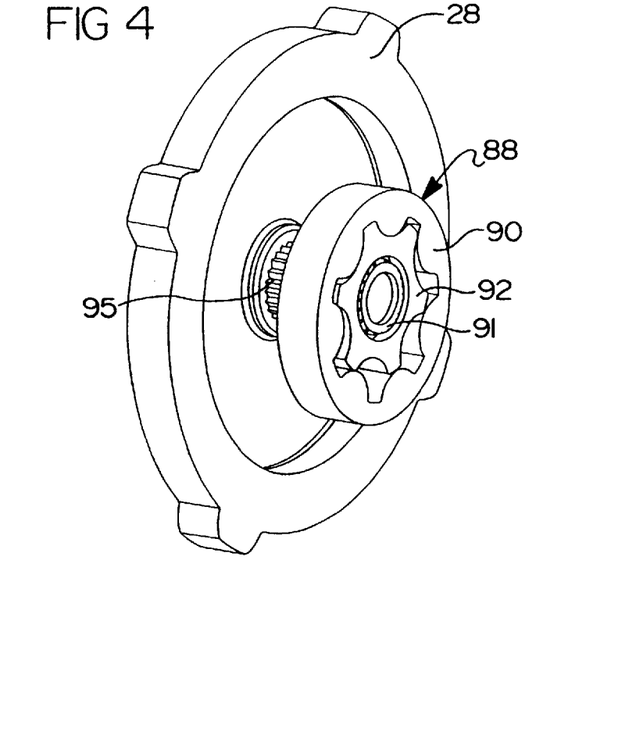
FIG. 4 is a perspective view of the actuation ring and the attached gerotor oil pump.
Figure 5:
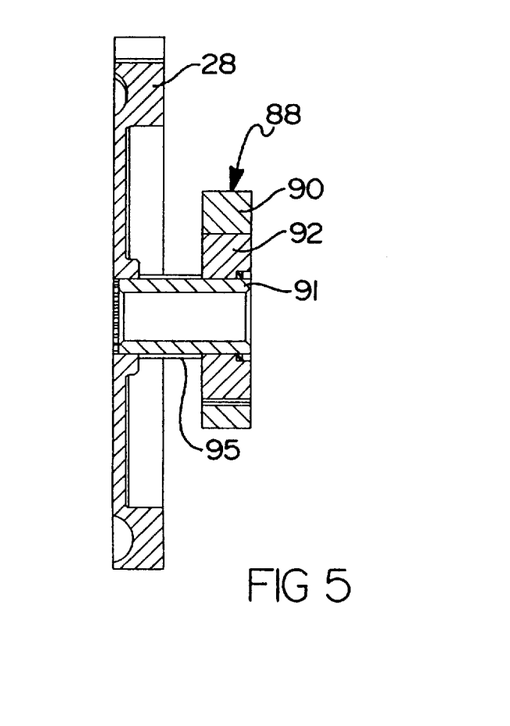
FIG. 5 is a cross sectional view of the actuation ring and gerotor pump connected by a coupling sleeve.

Referring now to FIGS. 4 and 5, actuation ring 28 is coupled to star 92 of oil pump 88 through a coupling sleeve 91. Coupling sleeve 91 has a plurality of splines 95 for positive coupling to star 92. Although FIG. 6 discloses star 92 coupled to coupling sleeve 91 by a key 93, any suitable means known in the art may be employed to couple star 92 to coupling sleeve 91. Rotation of the actuation ring 28 causes star 92 to rotate with ring 90. Ring 90 is mounted off center relative to support shaft 6 to cause oil drawn from inlet channel 102 to be displaced, compressed and delivered to outlet channel 104, as shown in FIG. 6.

Referring again to FIG. 3, the gerotor oil pump 88 is positively driven by actuation ring 28 through drive assembly 86. For cooling and wear purposes, the oil needs to be forced into and through clutch pack 10 which is compressed and loaded by the expansion of ball ramp actuator 8. The gerotor pump 88 pumps oil into a circumferential collection ring 106 disposed within the hub 46, collection ring 106 which is in communication with and provides oil to a plurality of oil ports 100. Oil ports 100 provide oil to the clutch pack 10 and support bearing 30. Insufficient oil in the clutch pack 10 may cause excess temperature, resulting in premature wear of friction material. A clutch cavity 110 for maintaining oil contact with clutch pack 10 is at least partially defined by the drive assembly 86. The clutch cavity 110 is sufficiently sealed to provide adequate cooling of the clutch pack 10. In the preferred embodiment, the clutch cavity 110 is further defined by an oil blocking ring 108 to prevent excess oil from flowing through bearing 84. It should be noted that although oil blocking ring 108 functions to reduce flow through bearing 84, this function is distinct from a sealed bearing where a seal prevents contamination of the bearing. Those skilled in the art will recognize that the clutch cavity 110 described herein may be employed with an external oil source in place of or in addition to pump 88.

Figure 7:
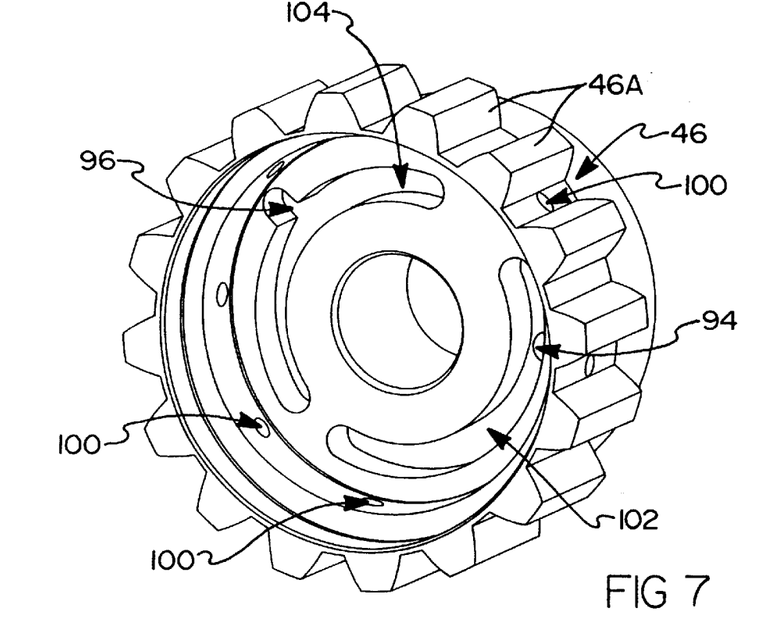
FIG. 7 is a perspective view of the hub of the inertia brake of the present invention.

Referring now to FIGS. 3 and 7, oil passages are formed in the hub 46 to allow oil to flow from the gerotor pump 88 into the outlet channel 104 into the outlet oil port 96 then to circumferential collection ring 106 and through the oil ports 100 and finally into the clutch pack 10 for cooling. Inlet channel 102 distributes oil from the inlet oil port 94 to the gerotor pump 88.

Figure 6:
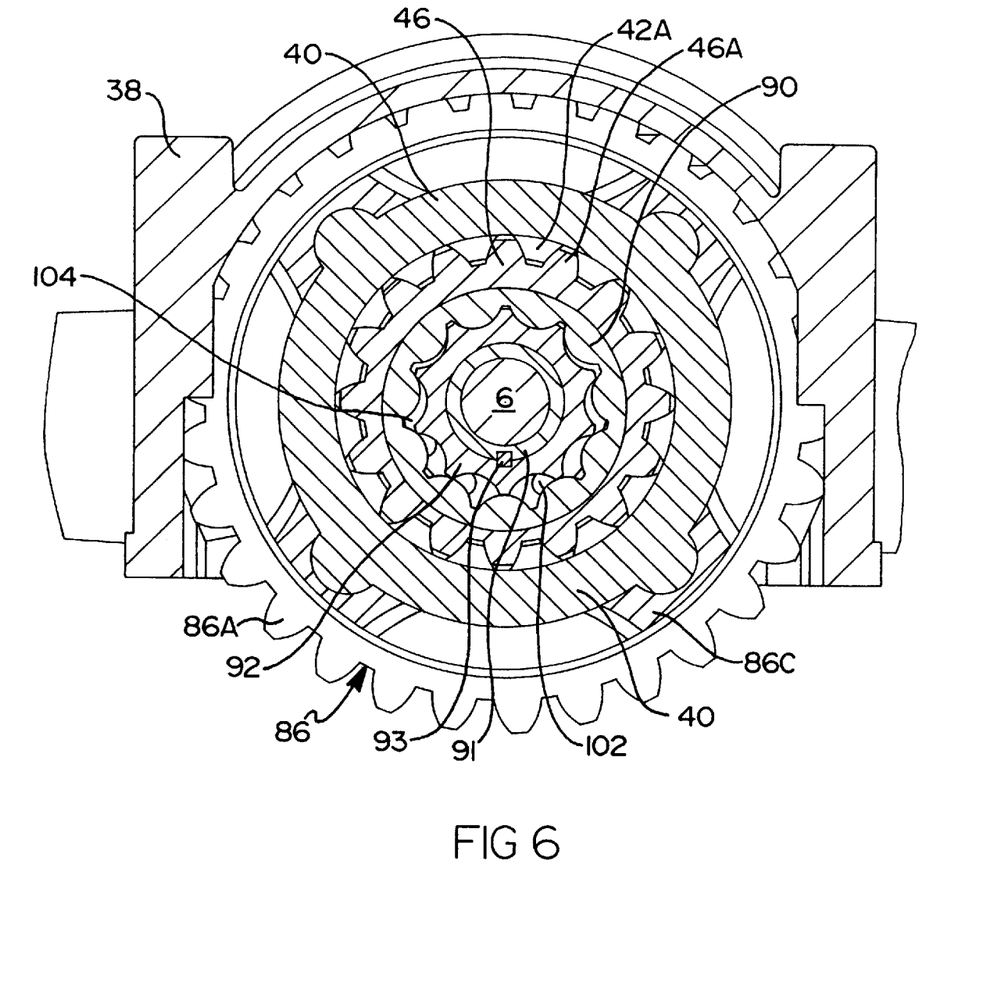
FIG. 6 is a sectional view of the inertia brake of the present invention revealing the operative elements of an oil pump.

Now referring to FIG. 6, the function of the gerotor oil pump 88 is to circulate oil throughout the interior of the brake housing 38 to provide lubrication and cooling. The gerotor oil pump 88 has a ring 90 and a star 92 which are rotated relative to one another to provide a pumping action from the input oil port 94 to the outlet oil port 96 and into the clutch pack 10 through oil ports 100. The star 92 is keyed to rotate with the drive assembly 86 through the actuation ring 28.

Referring now to FIG. 3, thrust bearing 80 separates the bearing race 78 from the face plate 82 which is stationary and held against the hub 46 to provide a sealing surface to the pump 88. The ball ramp mechanism 8 is preloaded with a pair of Belleville washers 68 which are disposed between the actuation ring 28 and bearing race 78. The Belleville washers 68 preload the ball ramp mechanism 8 to provide continuous contact between the roller elements 38A, 38B and 36C in their respective control grooves 35A, 35B and 35C and actuation grooves 37A, 37B, 37C. Disposed adjacent to the bearing race 78 is a thrust bearing 80 which allows for relative rotation between the bearing race 78 and a thrust plate 82 where the thrust plate 82 is adjacent to an oil pump 88 which can be of a type which is known as a gerotor set for supplying a circulation of oil within the inertia brake 4. The Belleville washers 68 provide a spring force upon a thrust plate 82 to keep the gerotor pump 88 in operational position. The Belleville washers 68 also provide a bias upon the ball ramp clutch mechanism 8 to accelerate release of the clutch 10.

The electrical connector 70 is captured and sealed to the housing 38 and provides for electrical connection between a control unit 45 and the electrical coil 12 through leads (not shown). The electrical coil 12 is supported in the coil support 74 through which passes support shaft 6 which extends to center and support the armature 16. The armature 16 is allowed to move axially relative to the support shaft 6. The driven clutch plates 40 are nonrotatably linked to the drive gear 86 where the drive gear 86 meshes with the gear driven by a transmission main shaft or a gear driven by a transmission countershaft such that upon activation, the inertia brake 4 provides a retarding force to the rotating shaft via the clutch pack 10 loading upon expansion of the ball ramp mechanism 8.

Inlet and outlet oil ports 94 and 96 provide for the ingress and egress of the oil through the oil pump 88 such that the oil flows throughout the housing 38 to lubricate and cool the components contained therein especially the driven and stationary clutch plates 40, 42. The relative rotation between the ring 90 and the star 92 of the gerotor pump 88 provides for oil flow through the inlet and outlet oil ports 94 and 96 and upstream and downstream flow of that oil into the oil ports 100 to the clutch pack 10 and into the housing 38.

The function of the bearing isolator is to eliminate any unintentional frictional drag forces on the control ring 26 of the ball ramp mechanism 8. This is effectuated with the use of two thrust bearings 30A and 30B which are inserted on either side of a separation plate 32 where the separation plate 32 is nonrotatably connected to an extension section 86B of the drive gear housing 86. The first thrust bearing rides against the end plate 14 while the second thrust bearing 30B rides against the control ring 26.

The hub 46 remains stationary while the drive assembly 86 rotates on bearing 84 and is driven by a rotating-transmission gear (not shown). The brake housing 38 is bolted to the transmission case 20 such that the gear section 86A meshes with the appropriate transmission gear. The driven clutch plates 40 are keyed to the clutch section 86C to rotate with the drive assembly 86 while the stationary clutch plates 42 are keyed to the stationary hub 46 through splines 42A formed on the stationary clutch plates 42 which engage the splines 46A formed on the hub 46.

Now referring to FIG. 7, a perspective view of the hub 46 is shown. The oil inlet channel 102 permits oil to flow from the oil ports 100 through the inlet oil port 94 into the gerotor pump 88. The oil outlet channel 104 permits the oil pumped by the gerotor pump 88 to flow to the oil outlet port 96 and through the oil ports 100 into the clutch pack 10.

Figure 8:
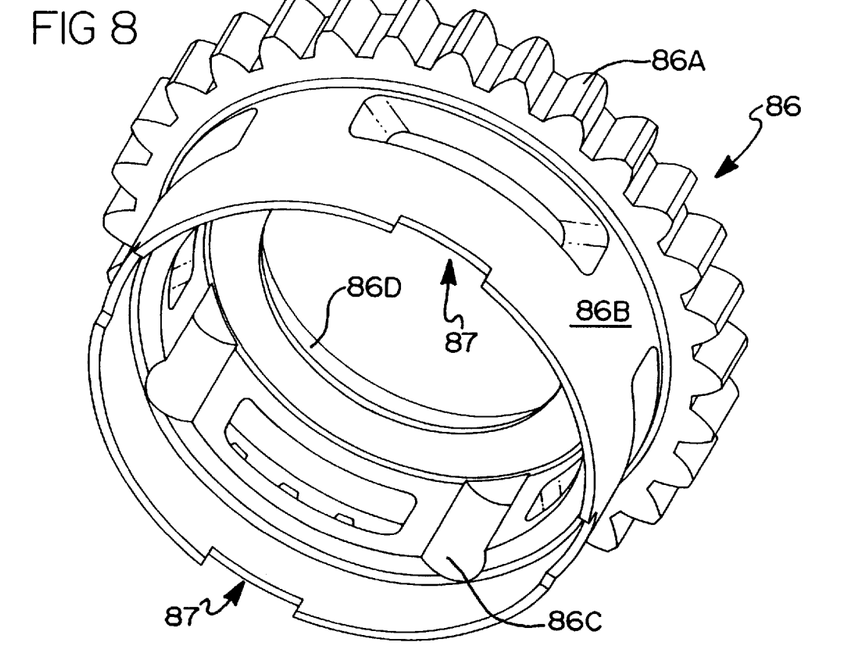
FIG. 8 is a perspective view of the drive assembly of the inertia brake of the present invention.

Now referring to FIG. 8, a perspective view of the drive assembly 86 is shown. The drive assembly 86 is fabricated as one piece and is comprised of a gear section 86A, an extension section 86B, a clutch section 86C and a bearing section 86D. The drive notches 87 engage the thrust plate 32 such that the two elements rotate together. The drive assembly 86 is fabricated in one piece to lower costs and improve reliability.

Figure 9:
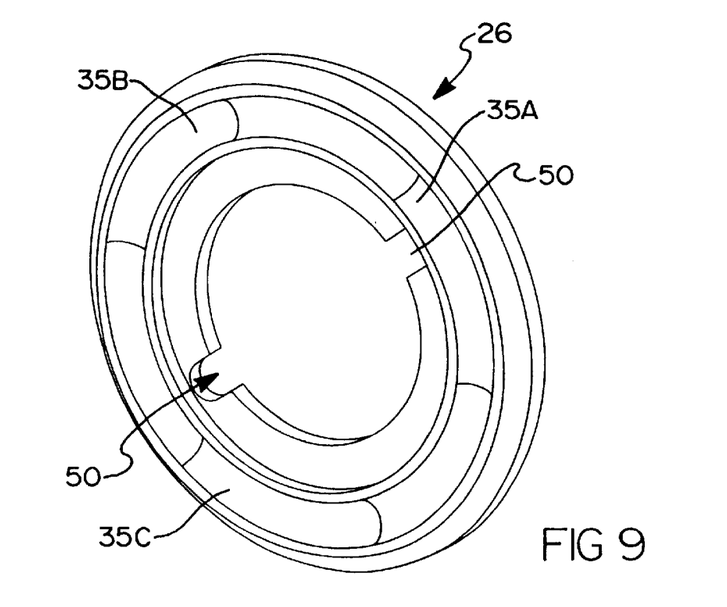
FIG. 9 is a perspective view of the control ring of the inertia brake of the present invention.
Figure 10:
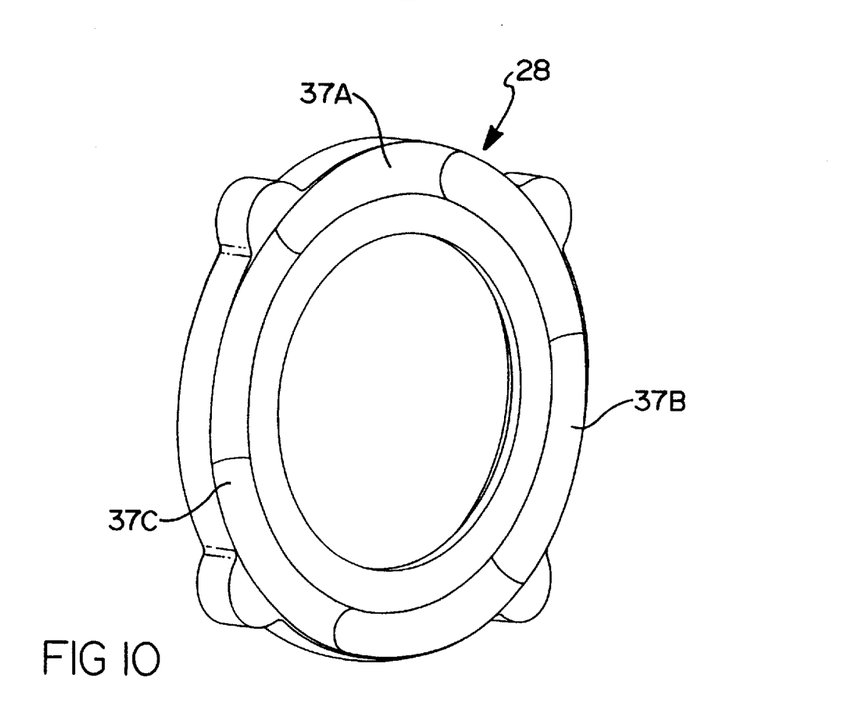
FIG. 10 is a perspective view of the actuation ring of the inertia brake of the present invention.

Now referring to FIGS. 9 and 10, perspective views of the control ring 26 and the activation ring 28 are shown. The pin apertures 50 in the control ring 26 engage the coupling pins 48 so that the control ring 26 rotates with the armature 16. Control grooves 35A, 35B and 35C are shown formed in the control ring 26 and corresponding activation grooves 37A, 37B and 37C are shown formed in the activation ring 28.

Now referring to FIG. 11, an elevational illustrative view of the ball ramp mechanism 8 of the present invention is shown. Variable depth circumferential control grooves 35A, 35B and 35C are formed in the control ring 26 and identical actuation grooves 37A, 37B and 37C are formed in the actuation ring 28. Control grooves 35A, 35B and 35C at least partially oppose respective actuation grooves 37A, 37B and 37C with rolling spherically shaped elements 36A, 36B and 36C providing axial separation between the control ring 26 and the actuation ring 28 and trapped between the opposed control and actuation grooves 35A, 37A and 35B, 37B and 35C, 37C. Thus, rolling element 36A engages grooves 35A and 37A; rolling element 36B engages grooves 35B and 37B; and rolling element 36C engages grooves 35C and 37C.

FIG. 12 is a cross-sectional illustrative view of the ball ramp mechanism 8 of FIG. 11 taken along line XII—XII. From this view, the separation distance 56 is clearly illustrated where the rolling element 36A is positioned in control groove 35A in the control ring 26 and in actuation groove 37A in the actuation ring 28 to provide a minimum separation distance 56. Note the varied depth of control and actuation grooves 35A and 37A which is identical to the geometry of control and actuation grooves 35B, 35C, 37B and 37C. Reference point 62 on control grooves 35A and reference point 64 on actuation grooves 37A are used to illustrate the relative rotation between the control ring 26 and the actuation ring 28 when the coil 12 is electrically energized and the ball ramp mechanism 8 is activated as shown in FIG. 13.

Now referring specifically to FIG. 13, a cross-sectional illustrative view of the ball ramp mechanism 8 of FIG. 11 taken along line XII—XII is shown with the ball ramp mechanism 8 partially activated. The control ring 26 has been rotated relative to the actuation ring 28 as illustrated by the shifting of reference points 62 and 64. The rolling element 36A has traversed portions of both control and actuation grooves 35A and 37A thereby increasing the separation distance 56 between the control ring 26 and the actuation ring 28. The control ring 26 is held in axial position relative to the transmission case 50 by the thrust bearing 30A and 30B which react against the end plate 14. Thus, the actuation ring 28 is moved toward the left to compress the clutch pack 10 thereby frictionally slowing the rotation of the transmission shaft (not shown) by reacting it indirectly to the transmission housing 8.

It will be appreciated by those of ordinary skill in the art that many variations in the foregoing preferred embodiment are possible while remaining within the scope of the present invention. Thus, the present invention should not be considered limited in the preferred embodiments or the specific choices of materials, configurations, applications or ranges of parameters employed therein.

What is claimed is:

1. An inertia brake for slowing the rotation of a freely rotating shaft in a transmission comprising:
   an inertia brake housing having a cavity therein, said housing attached to a transmission case;
   a clutch pack having a plurality of drive plates nonrotatably attached to said transmission shaft and a plurality of stationary plates attached to a hub mounted to said brake housing;
   a ball ramp actuator for loading said clutch pack comprising:
      an actuation ring disposed adjacent to said clutch pack where axial movement of said actuation ring results in a loading and an unloading of said clutch pack; a control ring disposed opposite to said actuation ring, said control ring and said actuation ring having opposed faces provided with circumferentially extending grooves, said grooves comprised of at least three opposed pairs of grooves having portions of varying depth; and rolling members disposed one in each of opposed pair of said groves, said grooves formed in said actuation ring and said control ring being arranged so that relative angular movement of said actuation ring and said control ring from a starting position thereof, causes axial movement of said actuation ring away from said control ring to axially load said clutch pack;
   an electrical coil mounted in an end plate where said end plate is attached to said brake housing;
   an armature having a circumferential tapered surface which frictionally contacts a mating tapered surface formed on said end plate when said coil is energized, said armature nonrotatably coupled to said control ring;
   a thrust plate separating a first and a second thrust bearing, said first thrust bearing axially supported against said control ring and said second thrust bearing axially supported against said end plate;
   a one-piece drive assembly rotatably driven by said rotating shaft through a transmission gear, said drive assembly having a gear section meshing with said transmission gear, a clutch section nonrotatably connected to said drive plates, an extension section coupled to said thrust plate and a bearing section for rotational support on said brake housing; and
   a clutch cavity at least partially defined by said drive assembly, said clutch cavity sealed for maintaining oil contact with said clutch pack.

2. The inertia brake of claim 1, wherein said clutch cavity is further defined by a support bearing and an oil blocking ring.

3. The inertia brake of claim 1, further comprising an oil pump driven by the relative rotation between said drive assembly and said hub.

4. The inertia brake of claim 3, wherein said oil pump is a gerotor pump having a star and a ring where said ring is disposed within said hub and said oil pump is driven by said actuation ring through a coupling sleeve.

5. The inertia brake of claim 4, wherein said hub includes a circumferential collection ring.

6. The inertia brake of claim 5, wherein said hub includes a plurality of oil ports in communication with said circumferential collection ring, said oil ports for providing oil to said clutch pack.

7. An inertia brake for slowing the rotation of a freely rotating shaft in a transmission comprising:
   a transmission case containing at least one transmission shaft and a plurality of transmission gears for changing a gear ratio in a vehicle driveline;
   an inertia brake housing attached to said transmission case having a cavity formed therein;
   a clutch pack disposed within said cavity having a plurality of driven plates nonrotatably linked to said transmission shaft and a plurality of stationary plates nonrotatably linked to said housing;

a ball ramp mechanism for applying a compressive force on said clutch pack comprising:
  an actuation ring disposed adjacent to said clutch pack where axial movement of said actuation ring results in a loading and an unloading of said clutch pack; a control ring disposed opposite to said actuation ring, said control ring and said actuation ring having opposed faces provided with circumferentially extending grooves, said grooves comprised of at least three opposed pairs of grooves having portions of varying depth; and rolling members disposed one in each of opposed pair of said groves, said grooves formed in said actuation ring and said control ring being arranged so that relative angular movement of said actuation ring and said control ring from a starting position thereof, causes axial movement of said actuation ring away from said control ring to axially load said clutch pack;
an electrical coil mounted within said housing;
an armature electromagnetically attracted toward said coil for applying a braking torque to said control ring;
a thrust plate separating a first and a second thrust bearing, said first thrust bearing axially pressing against said control ring and said second thrust bearing axially pressing against said housing; and
a one-piece drive assembly rotatably driven by said rotating shaft through a transmission gear, said drive assembly having a gear section meshing with said transmission gear, a clutch section nonrotatably connected to said drive plates, an extension section coupled to said thrust plate and a bearing section for rotational support by said brake housing;
a clutch cavity at least partially defined by said drive assembly, said clutch cavity sealed for maintaining oil contact with said clutch pack.

8. The inertia brake of claim 7, wherein said clutch cavity is further defined by a support bearing and an oil blocking ring.

9. The inertia brake of claim 7, further comprising an oil pump driven by the relative rotation between said drive assembly and said hub.

10. The inertia brake of claim 9, wherein said oil pump is a gerotor pump having a star and a ring where said ring is disposed within said hub and said oil pump is driven by said actuation ring through a coupling sleeve.

11. The inertia brake of claim 10, wherein said hub includes a circumferential collection ring.

12. The inertia brake of claim 11, wherein said hub includes a plurality of oil ports in communication with said circumferential collection ring, said oil ports for providing oil from said collection ring to said clutch pack.

* * * * *